(12) United States Patent
Gibson (10) Patent No.: US 7,856,807 B2
(45) Date of Patent: Dec. 28, 2010

(54) FLOW REVERSAL CHAMBERS FOR INCREASED RESIDENCE TIME

(75) Inventor: Donald A. Gibson, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 57 days.

(21) Appl. No.: 12/077,133

(22) Filed: Mar. 17, 2008

(65) Prior Publication Data

US 2009/0229254 A1  Sep. 17, 2009

(51) Int. Cl.
*F01N 3/00* (2006.01)

(52) U.S. Cl. .............................. 60/286; 60/274; 60/296; 60/303

(58) Field of Classification Search ................... 60/286, 60/295, 296, 297, 317
See application file for complete search history.

(56) References Cited

U.S. PATENT DOCUMENTS

| | | | |
|---|---|---|---|
| 5,281,403 A | 1/1994 | Jones | |
| 5,540,047 A | 7/1996 | Dahlheim et al. | |
| 5,601,792 A | 2/1997 | Hug et al. | |
| 6,312,650 B1 * | 11/2001 | Frederiksen et al. | ........ 422/180 |
| 6,444,177 B1 | 9/2002 | Muller et al. | |
| 6,449,947 B1 | 9/2002 | Liu et al. | |
| 6,516,610 B2 | 2/2003 | Hodgson | |
| 2005/0013756 A1 | 1/2005 | Amou et al. | |
| 2007/0000240 A1 * | 1/2007 | Hirata et al. | ................... 60/286 |
| 2007/0101703 A1 * | 5/2007 | Kanaya et al. | ................ 60/286 |
| 2007/0151251 A1 | 7/2007 | Haynes | |
| 2007/0169467 A1 | 7/2007 | Shirai et al. | |
| 2008/0041036 A1 | 2/2008 | Witte-Merl | |

OTHER PUBLICATIONS

ISA/US Commissioner for Patents, PCT International Search Report and Written Opinion of the ISA, PCT Patent Application No. PCT/US2009/001687, May 11, 2009.

* cited by examiner

*Primary Examiner*—Thomas E Denion
*Assistant Examiner*—Diem Tran
(74) *Attorney, Agent, or Firm*—Hamre, Schumann, Mueller & Larson, P.C.

(57) ABSTRACT

An apparatus is disclosed for increasing the residency time of a reducing agent in an exhaust gas cleaning system. The apparatus includes a first double-walled element in communication with a flow of exhaust having a first inner wall and a first outer wall. A second double-walled element is included having a second inner wall and a second outer wall. The second double-walled element is arranged in relation to the first double-walled element such that the second inner wall is positioned between the first inner wall and the first outer wall and the first outer wall is positioned between the second inner wall and the second outer wall. This arrangement defines a plurality of flow paths that reverses the flow of exhaust back on itself and then reverses the flow of exhaust once again.

29 Claims, 10 Drawing Sheets

FLOW REVERSAL CHAMBERS FOR INCREASED RESIDENCE TIME

FIELD OF THE INVENTION

The present invention relates to catalytic reduction systems for internal combustion engine exhaust and more particularly, to a decomposition chamber having annulated flow reversal chambers for increased residence time of a reducing agent injected into the flow of exhaust.

BACKGROUND

As hydrocarbons are burned in internal combustion engines, such as, for example, in a diesel engine or a spark-ignition engine, undesirable byproducts are formed. Some of the undesirable byproducts may be in the form of nitrogen oxides ("NOx"). Selective catalytic reduction ("SCR") of NOx with reducing agents, such as urea or ammonia for example, is known in industrial applications. In the SCR system, a reducing agent is injected into the flow of exhaust gas before the catalyst. Water in the droplets from the injection solution evaporates, leaving urea behind, which decomposes and hydrolyzes into ammonia. Ammonia is thus produced through the evaporation of the water droplets and urea decomposition. NOx reacts with the ammonia and is catalytically reduced in the presence of ammonia. Thus, a factor in ensuring proper operation of the SCR system is proper decomposition of urea to form adequate amounts of ammonia.

SUMMARY

One embodiment of the present application discloses an exhaust gas cleaning system having a decomposition chamber that increases the residency time of a reducing agent injected into a flow of exhaust before entering an SCR catalyst thereby ensuring that the reducing agent has adequate time to decompose. Other embodiments include unique apparatus, devices, systems, and methods for ensuring that a reducing agent has adequate time to decompose so that exhaust gas can be effectively cleaned before being communicated to the atmosphere. Further embodiments, forms, objects, features, advantages, aspects, and benefits of the present application shall become apparent from the detailed description and figures included herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
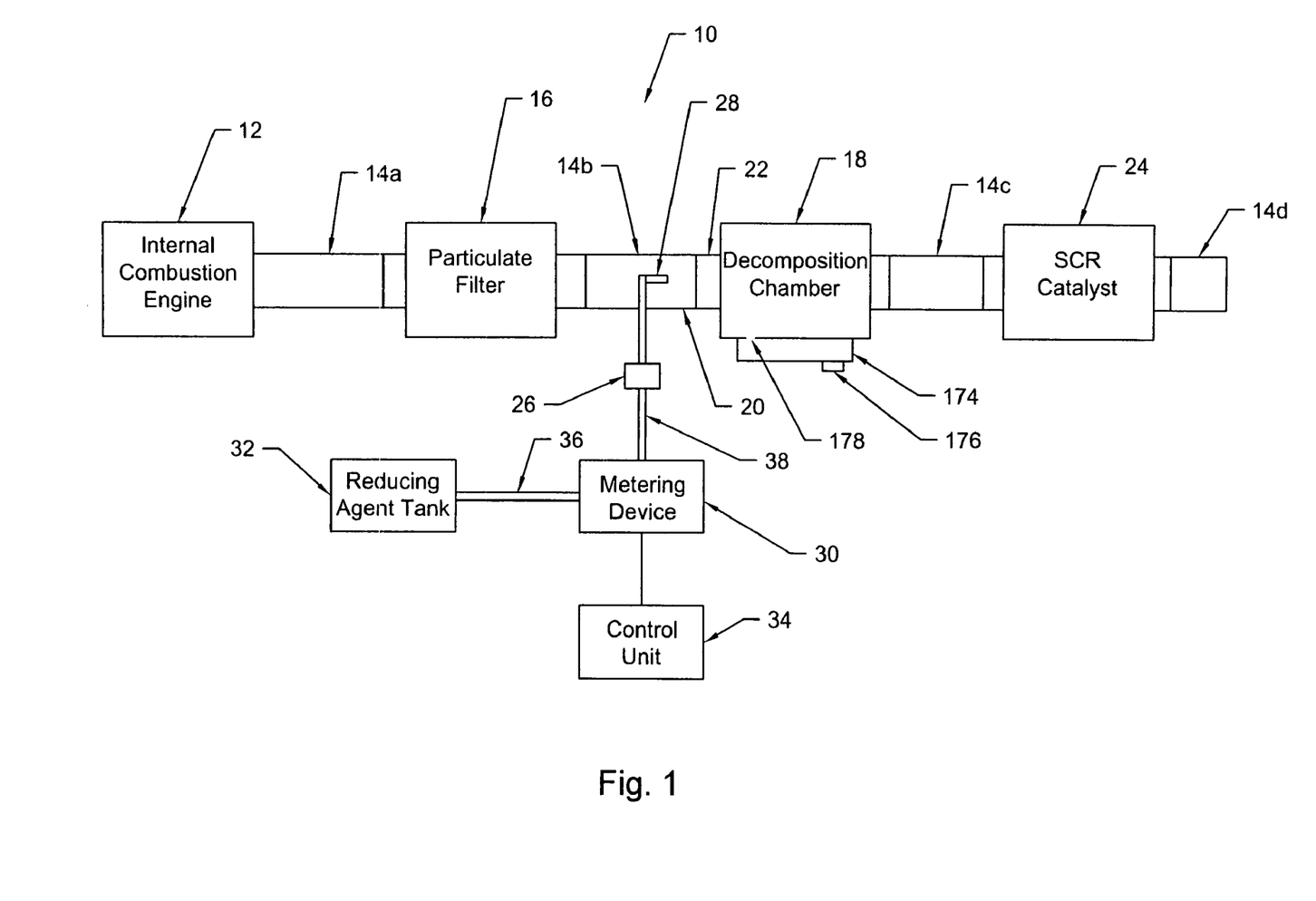
FIG. 1 is a diagram of an exhaust gas cleaning system.

Referring to FIG. 1, an exhaust gas cleaning system 10 is disclosed that is used to treat exhaust gas emitted or generated by an internal combustion engine 12. In one form, internal combustion engine 12 is a diesel engine but in other forms, may comprise a gasoline or spark-ignited engine. During operation of internal combustion engine 12, exhaust gas is discharged or emitted into an exhaust pipe 14a where it is directed or communicated to an input of a particulate filter 16 that is connected with exhaust pipe 14a. In one example, particulate filter 16 comprises a diesel particulate filter ("DPF") that is designed to remove diesel particulate matter or soot from the exhaust gas of the internal combustion engine 12. Particulate filter 16 may be a single use filter or a filter that is capable of burning off accumulated particulates, either through the use of a catalyst, or through an active process, such as a fuel burner which heats the filter to soot combustion temperatures through selective control of internal combustion engine 12.

In one form, filter 16 also includes a diesel oxidation catalyst configured to remove carbon monoxide, gaseous hydrocarbons and liquid hydrocarbons (unburned fuel and oil). A diesel oxidation catalyst is a flow through device that typically consists of a canister containing a honeycomb-like structure or substrate. The substrate has a large surface area that is coated with an active catalyst layer. Typically, this layer contains a small, well dispersed amount of precious metals. As exhaust gas traverses the catalyst, carbon monoxide, gaseous hydrocarbons and liquid hydrocarbons (unburned fuel and oil) are oxidized, thereby reducing harmful emissions.

The output of particulate filter 16 is connected to a decomposition chamber or unit 18 via exhaust pipe 14b. As such, exhaust gas exiting particulate filter 16 is directed or communicated to an exhaust gas inlet of decomposition chamber 18. In the illustrated exhaust gas cleaning system 10, a reducing agent 20 is injected into the flow of exhaust gas before entering decomposition chamber 18. In one form, reducing agent 20 is injected in the flow of exhaust in exhaust pipe 14b, but in other forms can be injected in an inlet 22 of decomposition chamber 18. Decomposition chamber 18 is configured to ensure that reducing agent 20 is provided with an adequate amount of time to decompose in the flow of exhaust before it exits decomposition chamber 18 and flows into an SCR catalyst unit 24 via exhaust pipe 14c. After passing through SCR catalyst unit 24, the cleaned exhaust gas exits system 10 via exhaust pipe 14d.

In the form illustrated in FIG. 1, a feed device or injection pump 26 is included that has a nozzle 28 positioned in an interior portion of exhaust pipe 14b. Feed device 26 is connected with a metering device 30 that controls the amount of reducing agent 20 that is injected into exhaust pipe 14b through feed device 26. Metering device 30 is connected with a tank or reservoir 32 that stores reducing agent 20. In one form, reducing agent 20 is urea and tank 32 stores the urea as an aqueous urea solution. A component needed for the proper functioning of SCR catalyst 24 is ammonia, which is obtained through the decomposition of urea. There is a critical residence or dwell time for a urea molecule inside decomposition chamber 18 to decompose into ammonia. Without the proper residence time, urea will not completely decompose and SCR catalyst 24 will not function efficiently. Decomposition chamber 18 is configured and arranged to increase the amount of residence time so that urea can decompose to form ammonia without increasing the overall length of decomposition chamber 18.

During operation, a control unit or electronic control module 34 determines how much reducing agent 20 should be injected into the flow of exhaust based on various operating parameters of internal combustion engine 12. Metering device 30 is connected with tank 32 by a conduit 36 and is configured to selectively obtain reducing agent 20 from tank 32. Metering device 30 then provides reducing agent 20 to feed device 26 via conduit 38. Feed device 26, which as previously set forth includes nozzle 28 that is positioned in the flow of exhaust, is configured to inject reducing agent 20 into the flow of exhaust. In one form, nozzle 28 atomizes the reducing agent 20 and comprises an aerosol-type atomizing cone.

Figure 2:
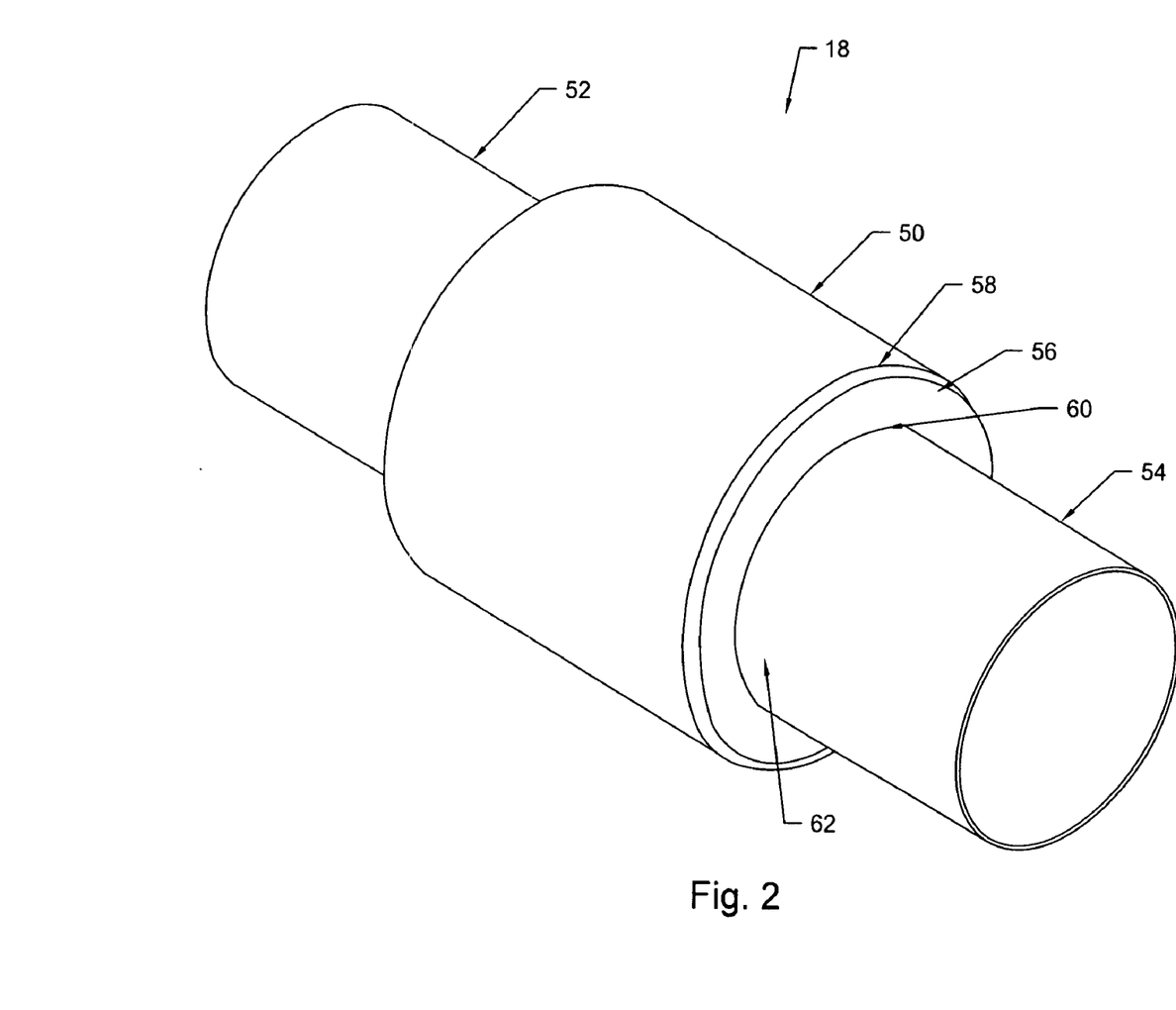
FIG. 2 is a perspective view of a replaceable decomposition chamber of the exhaust gas cleaning system.

Referring to FIG. 2, a perspective view of a representative decomposition chamber 18 is depicted. In one form, decomposition chamber 18 is designed to be replaceable in exhaust gas cleaning system 10. Decomposition chamber 18 includes a main housing or body 50, an inlet duct 52 and an outlet duct 54. In the illustrated example, main housing 50, inlet duct 52 and outlet duct 54 have a generally circular cross-sectional shape and comprise tubular bodies. An end cap 56 is connected with an outlet end 58 of main housing 50. End cap 56 includes an aperture 60 and an end 62 of outlet duct 54 is connected with or secured within aperture 60 of end cap 56.

Figure 3:
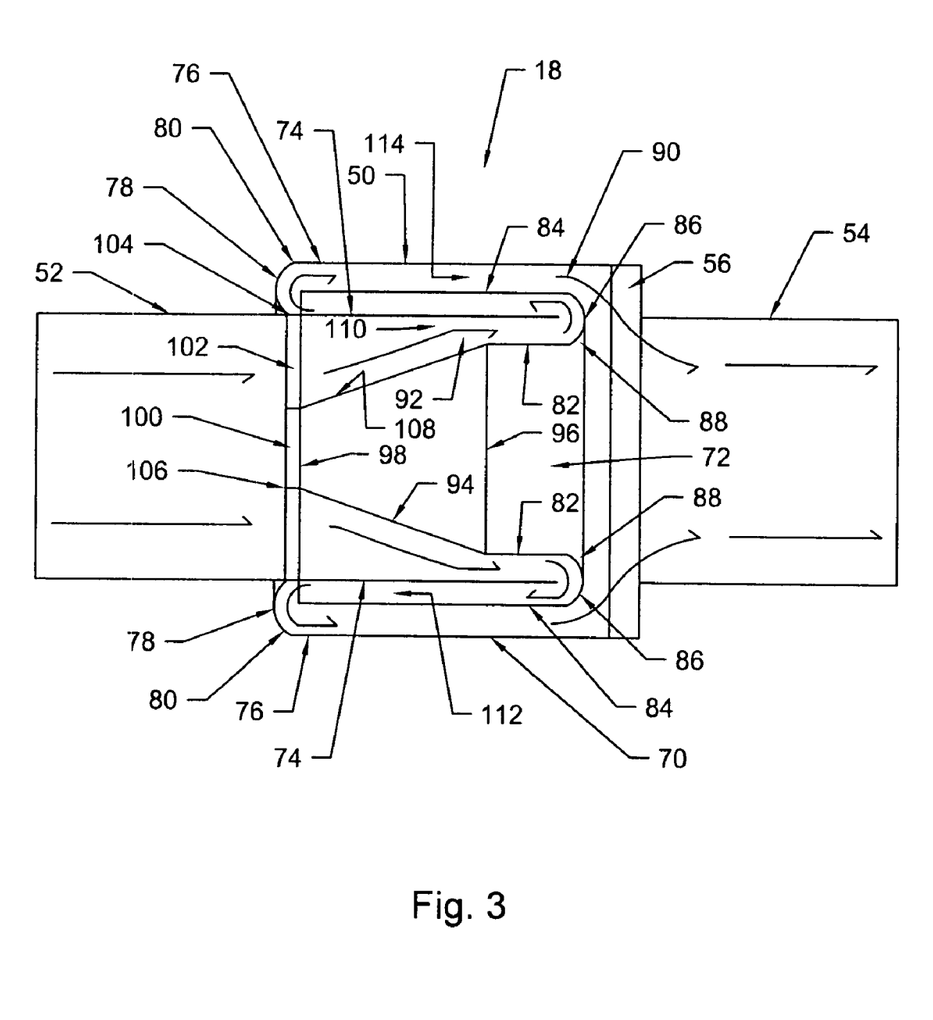
FIG. 3 is a cross-sectional view of the illustrative replaceable decomposition chamber illustrated in FIG. 2.

Referring to FIG. 3, a cross-sectional view of the illustrative decomposition chamber 18 set forth in FIG. 2 is depicted. Main housing 50 comprises a first double-walled element or member 70 arranged in a mating relationship with a second double-walled element or member 72. In one form, first double-walled element 70 and second double-walled element 72 comprise tubular shaped elements. First double-walled element 70 includes an inner wall 74 and an outer wall 76 separated by a bend 78 at one end 80 of first double-walled element 70. Second double-walled element 72 includes an inner wall 82 and an outer wall 84 separated by a bend 86 at one end 88 of second double-walled element 72. As illustrated, an end of first double-walled element 70 opposite end 80 defines an opening 90 between walls 74, 76. An end of second double-walled element 72 opposite end 88 defines an opening 92 between walls 82, 84. As set forth in detail below, when assembled, various flow paths are defined by main housing 50.

As set forth in FIG. 3, an internal element or member 94 is connected with an end of inner wall 82 of second double-walled element 72. In this form, internal element 94 has the shape of a conical frustum, but in other forms internal element 94 could be flat or bullet-shaped. A base 96 of internal element 94 is connected with inner wall 82 of double-walled element 72. An end or vertex 98 of internal element 94 is connected with an internal end of an internal cap 100. The opposite or external facing end of internal cap 100 is connected with an end of inlet duct 52. In this form, internal cap 100 includes a plurality of apertures 102 that allow exhaust gas to flow through internal cap 100. An end 104 of internal cap 100 is connected with internal wall 74 of first double-walled element 70. In addition, an end 106 of inlet duct 52 is connected with or welded to an inside surface of internal wall 74.

An outer surface 108 of internal element 94, an outer surface of internal wall 82 of second double-walled element 72, and an outer surface of inner wall 74 of first double-walled element 70 define a first flow path or chamber 110 in main housing 50. Bend 86 formed by second double-walled element 72 causes exhaust gas flowing through first flow path 110 to reverse direction into a second flow path or chamber 112. Second flow path 112 is defined by an inside surface of internal wall 74 of first double-walled element 70 and an inside surface of outer wall 84 of second double-walled element 72. Bend 78 formed by first double-walled element 70 causes exhaust gas flowing through second flow path 112 to reverse direction into a third flow path or chamber 114. Third flow path 114 is defined by an outside surface of outer wall 84 of second double-walled element 72 and an inside surface of outer wall 76 of first double-walled element 70.

As such, during operation exhaust gas from internal combustion engine 12 enters decomposition chamber 18 through inlet duct 52. The exhaust gas then travels through apertures 102 in internal cap 100 where it enters first flow path or chamber 110. The exhaust gas is then reversed in direction by bend 86 and directed into second flow path or chamber 112 where it flows back toward inlet duct 52. Once exhaust gas reaches bend 78, it then reverses direction once again where it enters third flow path or chamber 114. The exhaust gas then exits third flow path 114 and flows into outlet duct 54 where it exits decomposition chamber 18 and is directed toward SCR catalyst 24.

The residence time for a given molecule of reducing agent 20 in decomposition chamber 18 is given by the following equation: $T=L/V$, where T is time, L is the effective length of the chamber (or flow paths 110, 112, 114), and V is the velocity of the molecule. In order to increase the residence time, the length of the overall chamber must be increased, the velocity of the exhaust flow must be decreased, or both. The length of the chambers or flow paths can be increased by two methods. The first method is to increase the length of flow paths 110, 112, 114. Increasing the length of flow paths 110, 112, 114 makes decomposition chamber 18 longer, which may infringe on spatial constraints in which decomposition chamber 18 is installed. As disclosed herein, a second method is to fold or direct the exhaust flow back on itself thereby allowing a longer chamber length with the same overall assembly length.

The velocity of the exhaust flow in a given chamber defined by flow paths 110, 112, 114 is given by the following equation: $V=CFM/A$, where CFM is the volumetric flow rate (Cubic Feet per Minute ("CFM")) and A is the area defined by chambers 110, 112, 114. The CFM of a given system is constant for a specific operating condition of internal combustion engine 12. As such, a way to decrease the velocity through flow paths 110, 112, 114 is to increase the area of flow paths 110, 112, 114.

The area of second flow path 112, the flow path that reverses the flow of exhaust back toward inlet duct 52, is represented by a concentric annulus defined by inner wall 74 of first double-walled element 70 and outer wall 84 of second double-walled element 72. The area of third flow path 114, the flow path that reverses the flow of exhaust once again back toward outlet duct 54, is represented by a concentric annulus defined by outer wall 84 of second double-walled element 72 and outer wall 76 of first double-walled element 70. As the flow of exhaust progresses through the switchbacks (i.e.—second flow path 112 and third flow path 114), the circular nature of the flow is maintained, but the diameter of the stream is increased. The first switchback causes the flow of exhaust to go back toward the inlet duct 52 at an increased diameter. The second switchback causes the flow to increase again in diameter and go back toward outlet duct 54. Each time the flow is turned back on itself, the size of the annulus increases and the flow speed decreases. All of this combines to increase the amount of time a molecule of reducing agent 20 is in residence in decomposition chamber 18.

The area of each concentric ring can be written as:

$$A_n = \pi(2R_i t + (2n-1)t^2)$$

where, $A_n$ is the area of a given ring (or flow path), $R_i$ is the inside radius of the entire system, and t is the thickness of each ring (assumed to be the same). So, time is shown as T=(L*A)/CFM. As such, since it is desirable to provide adequate residence time, but with reduced length so as to miniaturize decomposition chamber 18, the above formulae are used to derive the following formula for reversed chamber length:

$$L = L_s \frac{A_s}{A_1 + A_2 + A_3}$$

where $L_s$ is the length of a straight chamber device, $A_s$ is the area of the same device and $A_1$, $A_2$ and $A_3$ are the respective areas of the reversed chamber. This can be further boiled down to:

$$L = L_s \frac{R_s^2}{6R_i t + 9t^2}$$

where $L_s$ is the length of a straight chamber device, $R_s$ is the radius of the same device, $R_i$ is the radius of the inside of the innermost ring.

The preceding equations demonstrate that the total time within a specific length chamber or flow path can be controlled by the total diameter of the chamber. Thus, a 4" outside diameter ("OD"), 12" long straight chamber can be replaced by a 6" OD reversed chamber that is 7.1" long. If the reversed chamber OD were 7.5", the length would be about 4.1" and if it were 9" OD, the required length would be about 2.7". As seen above, as the OD of the system gets larger, the length of the system gets smaller. That is to say, as the OD increases, the flow of exhaust approaches radial flow.

Two benefits of using a decomposition chamber 18 as disclosed herein are retained heat and decreased overall length. Prior art decomposition chambers use a single straight tube. This tube is typically insulated to help retain heat to aid in urea decomposition. The decomposition chamber 18 disclosed herein allows the exhaust flow to come back on itself thereby reducing the amount of area exposed to the atmosphere and causing the decomposition chamber 18 to become self-heating. As a result, a smaller amount of insulation can be used, or in some forms, no insulation at all if the decomposition chamber is long enough. The second benefit is decreased overall length of the decomposition chamber 18. Since the exhaust flow folds back on itself twice, there is not as much assembly length required to achieve the required residence time.

Two potential configurations of the decomposition chamber 18 are straight-through flow and helical flow. The flow area through the different chambers does not change. So if the flow were at an angle, the speed of each flow section would have to increase. The net effect is that the residence time would be approximately the same whether or not spin were used. A potential benefit to using spin, however, is the effective radius at each switchback. Using straight-through flow, the radius is defined by the thickness of the rings. Using spinning flow, the effective radius is increased, potentially reducing the amount of backpressure created by the switchback or flow reversal.

Referring to FIG. 3, the profile of a straight flow form of the present invention is illustrated. As illustrated, as exhaust gas enters inlet duct 52 it travels into an inner chamber defining first flow path 110. As the exhaust gas travels through first flow path 110 it reverses direction at bend 86 and begins traveling back toward inlet duct 52 in second flow path 112. After traveling a predetermined length in second flow path 112, the exhaust gas reverses direction at bend 78 and enters third flow path 114. After traveling a predetermined distance in third flow path 114, the exhaust gas exits main housing 50 and enters outlet duct 54 where the exhaust gas is directed out of decomposition chamber 18 toward SCR catalyst unit 24.

Figure 4:
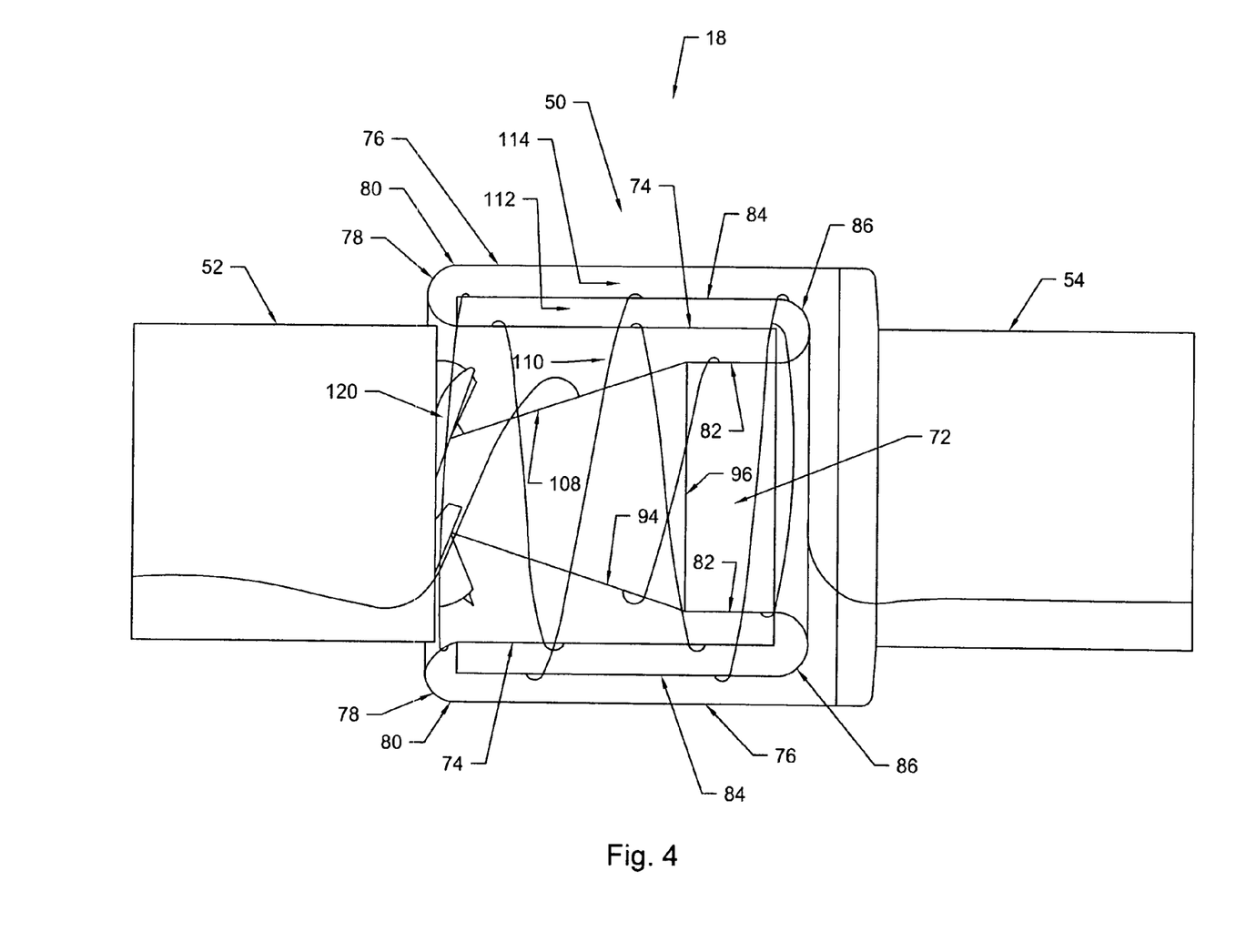
FIG. 4 illustrates a replaceable decomposition chamber with the main housing depicted in a partial cross-sectional view illustrating a helical exhaust flow pattern.
Figure 5:
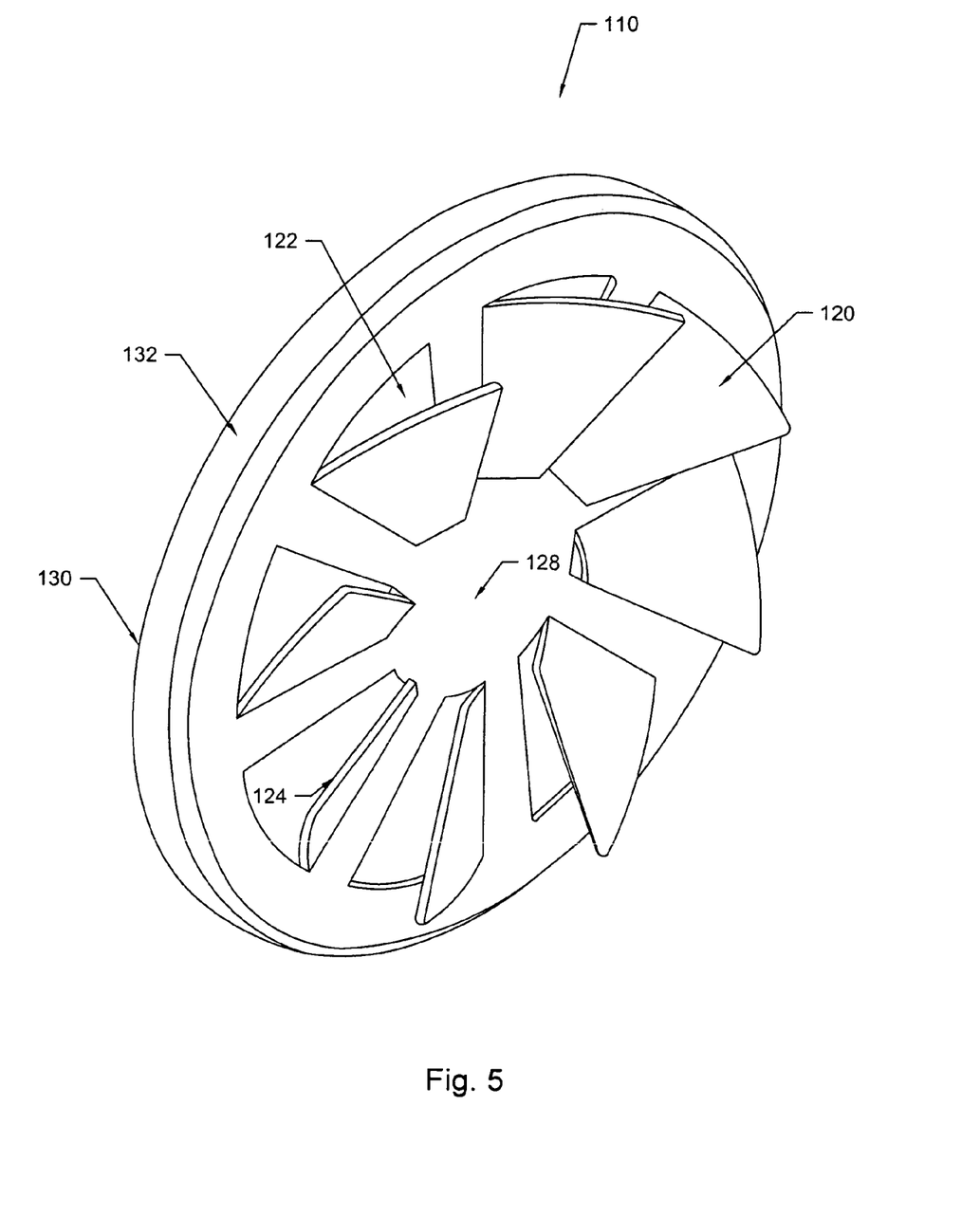
FIG. 5 is an illustrative internal cap of the decomposition chamber having fins.

Referring to FIGS. 4 and 5, an illustrative form in which decomposition chamber 18 utilizes helical flow is illustrated. In this form, internal cap 110 includes a plurality of fins 120. Fins 120 induce a spin in the flow of exhaust. As exhaust gas passes through a plurality of apertures or passageways 122 in internal cap 110, an inside surface 124 of fins 120 induce a spin on the flow of exhaust. As such, as illustrated in FIG. 4, the exhaust gas follows a helical flow pattern as it travels through flow paths 110, 112, 114.

Figure 6:
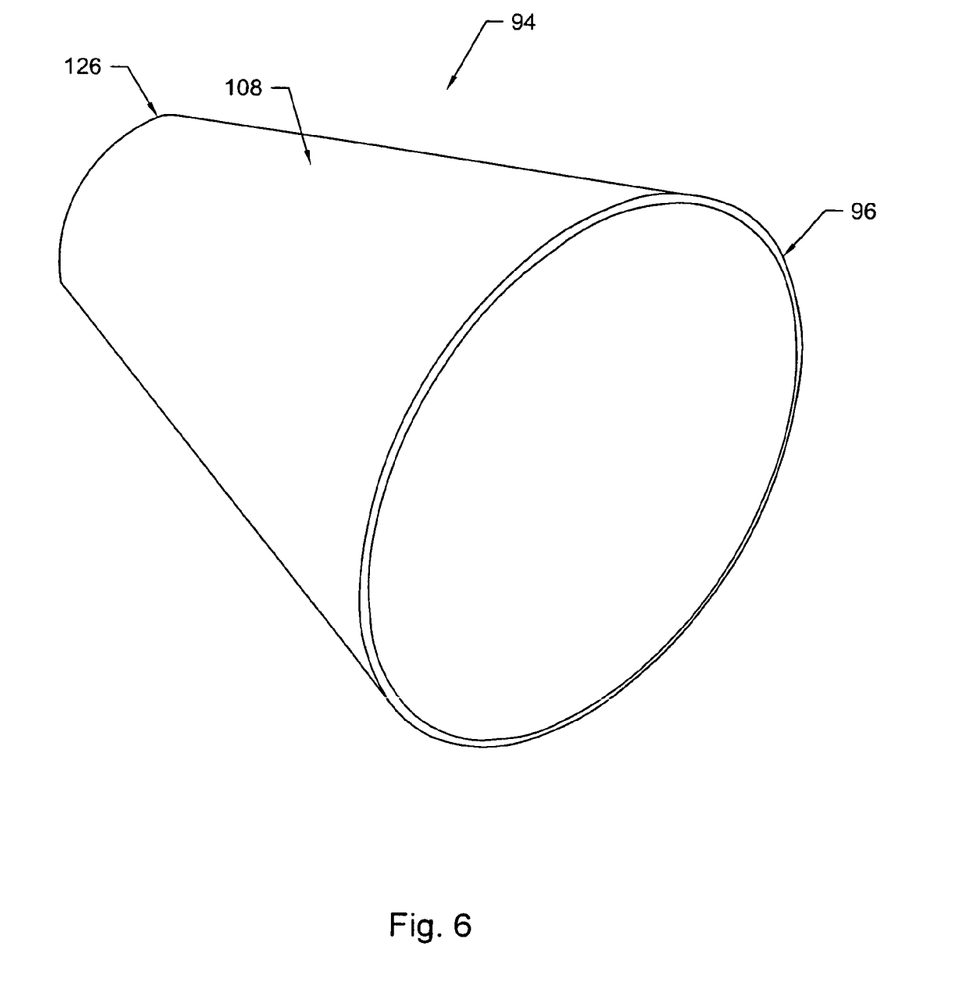
FIG. 6 is a perspective view of an internal element of the decomposition chamber.

Referring to FIG. 6, a perspective view of a representative internal member 94 is illustrated. Referring collectively to FIGS. 5 and 6, when assembled, an end or vertex 126 of internal member 94 is connected with or welded to a central portion 128 of internal cap 110. As previously set forth, an end of inlet duct 52 is connected with an interior portion 130 of end cap 110 that is defined by a lip 132 running around the circumference of end cap 110. The outer surface of internal cap 110 is connected with or positioned in or welded to the outside surface of outer wall 74 of first double-walled element 70.

Figure 7:
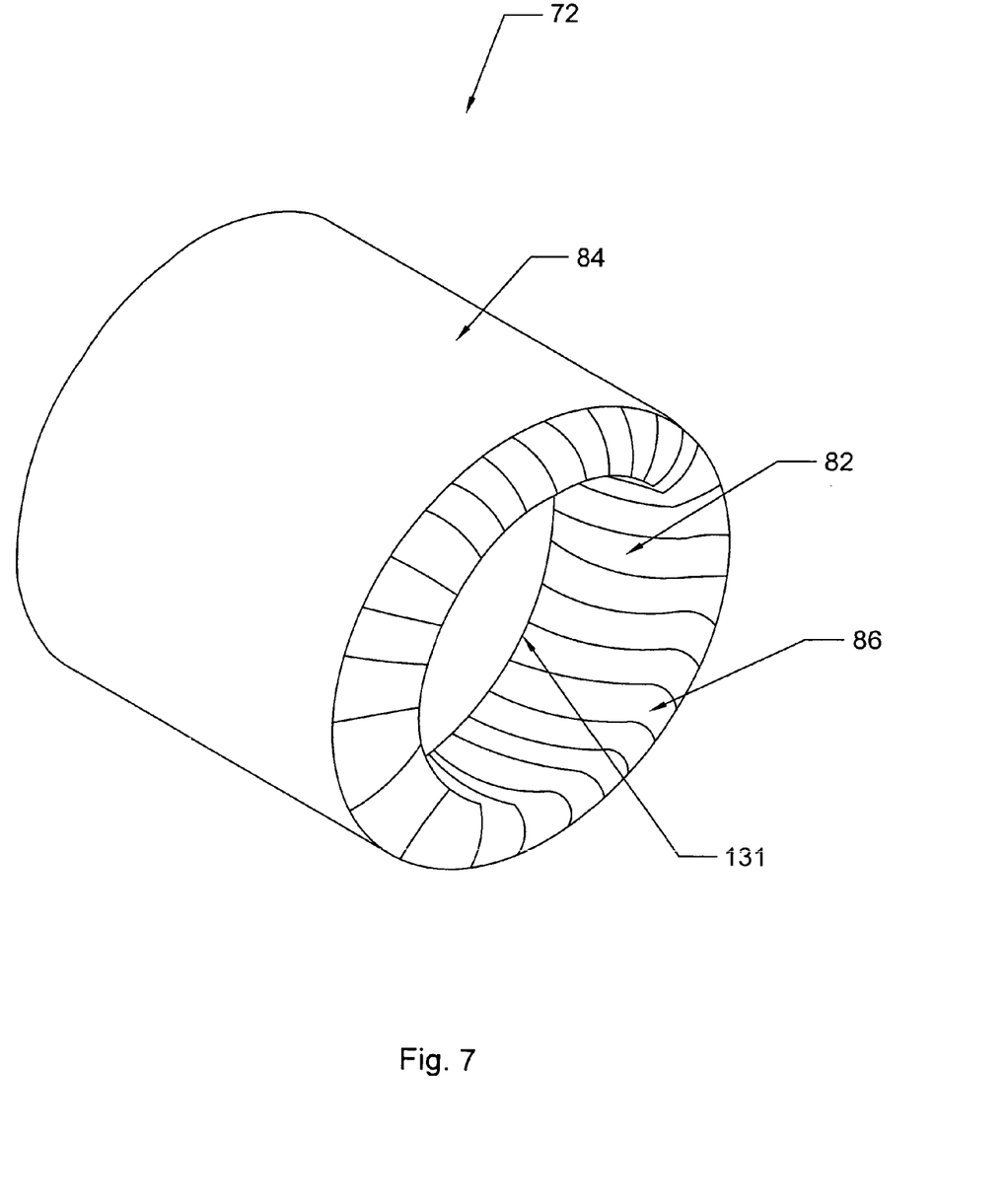
FIG. 7 is a perspective view of an illustrative double-walled element of a representative decomposition chamber.

Referring to FIG. 7, a perspective view of second double-walled element 72 is illustrated. As previously set forth, second double-walled element 72 includes an inner wall 82 and an outer wall 84. Inner wall 82 and outer wall 84 are separated by a bend 86. As illustrated, second double-walled element 72 defines concentric annuli that define flow paths within main housing 50. As previously set forth, base 96 of internal member 94 is connected with an end 131 of inner wall 82. Although not specifically illustrated in perspective view, first double-walled element 72 also defines concentric annuli that also define flow paths within main housing 50. As illustrated in FIGS. 3 and 4, inner wall 74 of first double-walled element 70 is positioned between inner wall 82 and outer wall 84 of second double-walled element 72. Outer wall 84 of second double-walled element 72 is positioned between inner wall 74 and outer wall 76 of first double-walled element 70.

Figure 8:
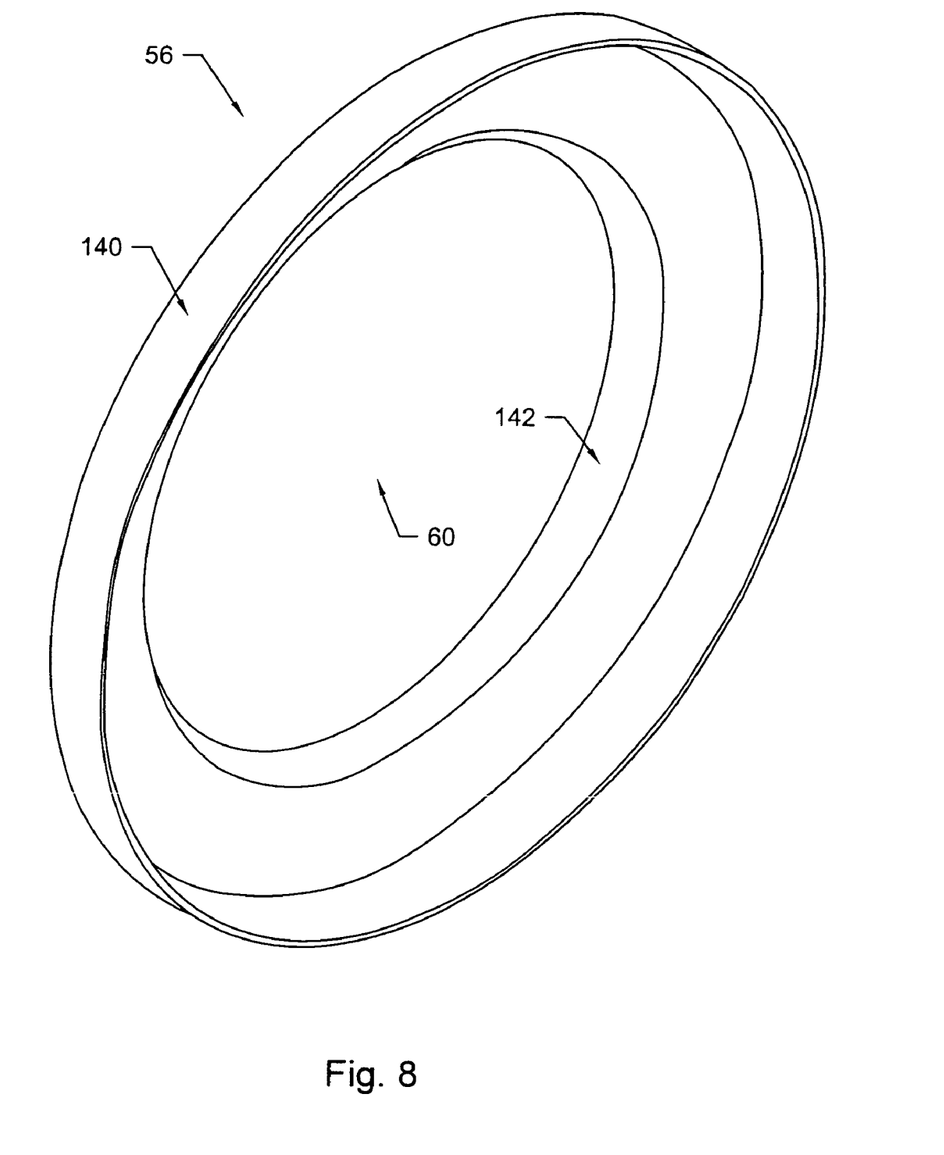
FIG. 8 is a perspective view of an illustrative end cap of the decomposition chamber.

Referring to FIG. 8, a perspective view of an illustrative end cap 56 is illustrated. As depicted, end cap 56 includes an outer lip 140 and an inner lip 142. Outer lip 140 is positioned around end 58 of outside wall 76 of first double-walled element 70. Inner lip 142 is positioned around a respective end of tubular outlet duct 54. Inner lip 142 defines aperture 60 in end cap 56 that allows exhaust gas to flow out of main body 50 into outlet duct 54.

Figure 9A:
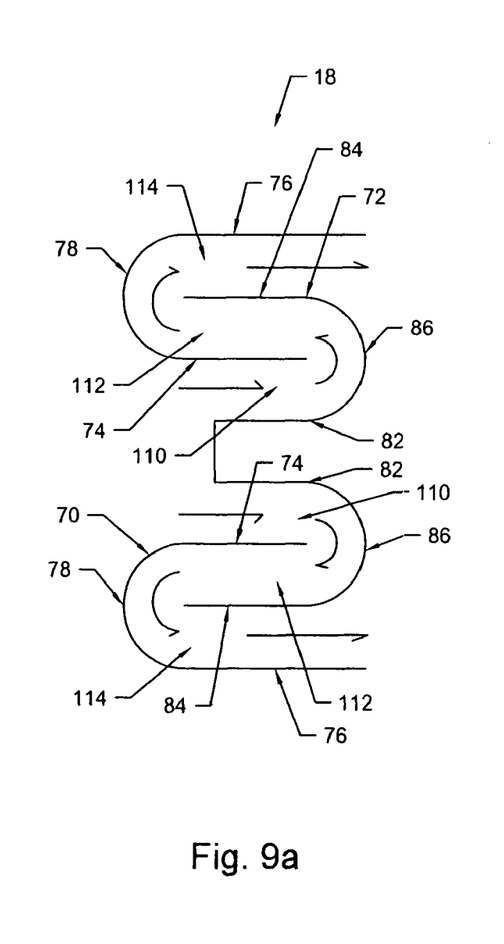
FIGS. 9a-9c is a partial cross-sectional view of a portion of representative decomposition chambers.
Figure 9B:
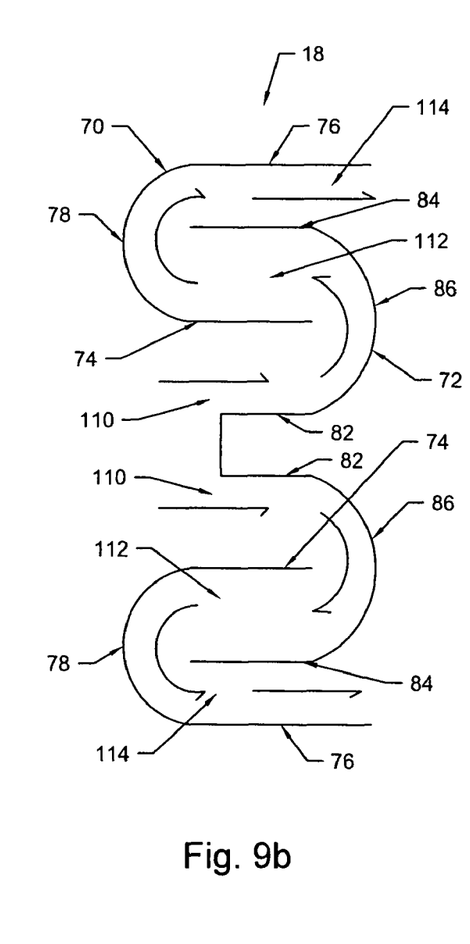

Referring to FIGS. 9a and 9b, a portion of decomposition chamber 18 is illustrated demonstrating a straight flow of exhaust through first, second, and third flow paths 110, 112, 114. As previously set forth, increasing the diameter of decomposition chamber 18 increases the amount of time that the reducing agent 20 has to decompose in decomposition chamber 18. As such, it will take longer for a flow of exhaust to flow through the example illustrated in FIG. 9b than that illustrated in FIG. 9a because of the increase in diameter. This is because the example illustrated in FIG. 9b has a larger area than the example illustrated in FIG. 9b. In addition, the flow of exhaust gas flows in an axial pattern or in other words, flows back and forth along the horizontal axis of decomposition chamber 18. Another result of changing from FIG. 9a to FIG. 9b is that a shorter chamber length can be used to achieve the same residence time.

Figure 9C:
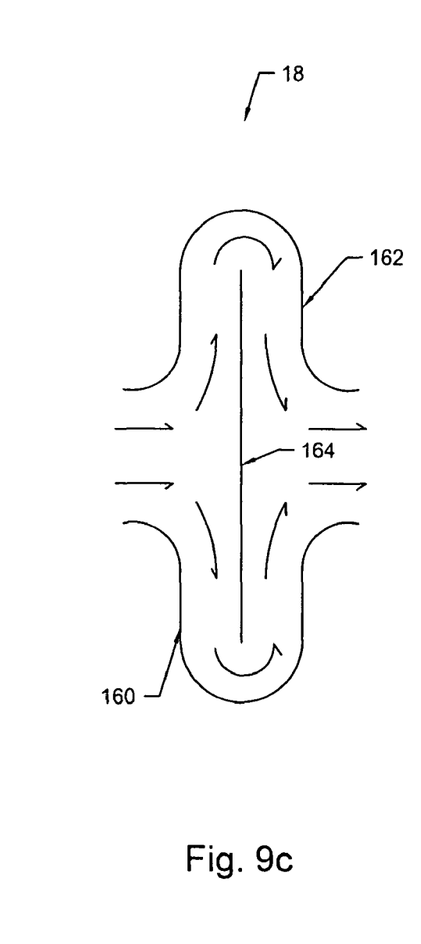

In FIG. 9c, an alternative arrangement is illustrated that will also increase the residency time of reducing agent 20 in decomposition chamber 18. In this example, the flow of exhaust gas flows in a radial pattern in relation to the horizontal axis of decomposition chamber 18. In this form, decomposition chamber 18 includes a first tubular element 160 connected with a second tubular element 162. A diverter element 164 is positioned in a central portion of decomposition chamber 18 to cause the exhaust gas to flow radially within decomposition chamber 18.

Figure 10:
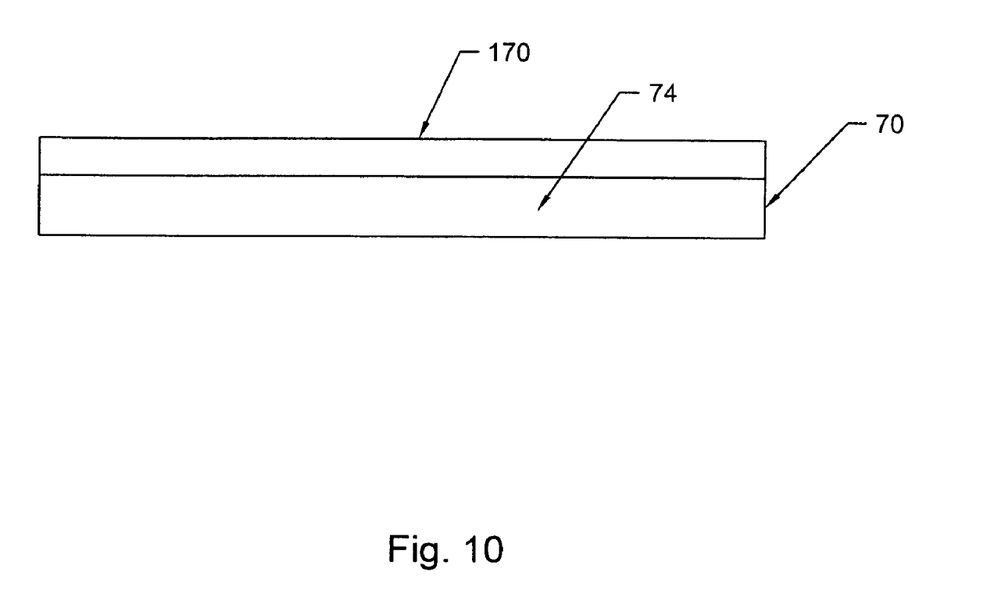
FIG. 10 is a view of walls of the decomposition chamber coated with a catalyst.

Referring to FIG. 10, an additional aspect of any configuration in some forms would include adding a coating of catalyst 170 to the walls of the chambers prior to assembly. In the example illustrated in FIG. 10, a portion of inner wall 74 of first double-walled element 70 is illustrated. Inner wall 74 has been coated with catalyst 170. The total surface area of the catalytic coating (the inside of the chambers) would be about 150 $in^2$ for a standard straight system and 600 $in^2$ for a reversed flow chamber, an increase of 400%. The increase in inner surface area would aid in decomposition as well as NOx reduction.

Another benefit provided by decomposition chamber 18 disclosed herein is that the external area exposed to the atmosphere would be about 150 $in^2$ for a prior art straight system and 132 $in^2$ for a reversed flow chamber, a decrease of about 12%. This reduction in outer surface area would decrease the heat loss, which means that insulation would not be required for this device.

Referring back to FIG. 1, in this form at the bottom of the initial stage defined by first flow path 110 is a containment housing 174 with a removable plug 176. An aperture 178 is included that runs through the walls defining the second and third flow paths 112, 114. If there is any liquid reducing agent 20 that fails to decompose, it may drip down into containment housing 174 to be cleaned out at periodic intervals. Containment housing 174 is heated by the flow of exhaust or external means to prevent crystallization of the reducing agent 20 and to aid in additional decomposition.

Utilizing the decomposition chamber 18 disclosed herein significantly increases the length of the flow path of the exhaust stream (almost three times) without increasing the length of the overall decomposition chamber 18. This allows improved decomposition in a much tighter region. Also, the design allows the exposed region to be much smaller thereby allowing better retention of heat. If the decomposition chamber 18 is long enough, insulation may not be required. The spin or helical flow configuration also helps to decrease any backpressure.

As set forth above, in one form a system is disclosed that includes a feed device positioned in an exhaust gas channel for selectively introducing a reducing agent into a flow of exhaust; a housing having an exhaust gas inlet in communication with the exhaust gas channel, the housing defining a first flow path directing the flow of exhaust in a first direction, a second flow path directing the flow of exhaust in a second direction, and a third flow path directing the flow of exhaust back to the first direction; and an exhaust gas outlet in communication with the third flow path.

In another form, an apparatus is disclosed that includes a first double-walled element in communication with a flow of exhaust having a first inner wall and a first outer wall; a second double-walled element having a second inner wall and a second outer wall, the second double-walled element being arranged in relation to the first double-walled element such that the second inner wall is positioned between the first inner wall and the first outer wall and the first outer wall is positioned between the second inner wall and the second outer wall; and where the first inner wall and the second inner wall define a first chamber for the flow of exhaust, the second inner wall and the first outer wall define a second chamber for the flow of exhaust, and the first outer wall and the second outer wall define a third chamber for the flow of exhaust.

In yet another form, a method is disclosed that comprises injecting a reducing agent into a flow of exhaust; directing said flow of exhaust into a first flow chamber; reversing the direction of said flow of exhaust by directing said flow of exhaust into a second flow chamber; and reversing the direction of said flow of exhaust once again by directing said flow of exhaust into a third flow chamber.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An exhaust gas cleaning system, comprising:
    an exhaust gas channel;
    a feed device positioned in the exhaust gas channel for selectively introducing a reducing agent into a flow of exhaust;
    a decomposition chamber having a housing with an exhaust gas inlet in communication with said exhaust gas channel, said housing defining a first flow path directing said flow of exhaust in a first direction, a second flow path directing said flow of exhaust in a second direction, and a third flow path directing said flow of exhaust back to said first direction;

the first flow path is defined between an outer surface of a first wall and an inner surface of a second wall that is disposed around the first wall;

the second flow path surrounds the first flow path and the third flow path surrounds the second flow path; and an exhaust gas outlet in communication with said third flow path.

2. The exhaust gas cleaning system of claim 1, where said second flow path has an overall area smaller than said third flow path.

3. The exhaust gas cleaning system of claim 1, where at least one of said first flow path, said second flow path, and said third flow path is coated with a catalyst.

4. The exhaust gas cleaning system of claim 1, further comprising a containment housing connected with said housing for storing excess reducing agent.

5. The exhaust gas cleaning system of claim 1, wherein the first and second walls are tubular.

6. The exhaust gas cleaning system of claim 5, where a portion of the first wall has a generally conical shape.

7. The exhaust gas cleaning system of claim 5, where the second flow path is defined between an outer surface of the second wall and an inner surface of a third wall.

8. The exhaust gas cleaning system of claim 7, where the third flow path is defined between an outer surface of the third wall and an inner surface of a fourth wall.

9. The exhaust gas cleaning system of claim 1, further comprising a diffuser positioned in said exhaust gas inlet to induce said flow of exhaust to flow in a helical pattern through said first, second, and third flow paths.

10. The exhaust gas cleaning system of claim 9, where said diffuser includes a plurality of fins.

11. The exhaust gas cleaning system of claim 1, where said first flow path transitions to said second flow path at a bend in a first double-walled tubular element in said housing.

12. The exhaust gas cleaning system of claim 11, where said second flow path transitions to said third flow path at a bend in a second double-walled element in said housing.

13. A decomposition chamber, comprising:

a first double-walled element in communication with a flow of exhaust having a first inner wall and a first outer wall;

a second double-walled element having a second inner wall and a second outer wall, said second double-walled element being arranged in relation to said first double-walled element such that said second inner wall is positioned between said first inner wall and said first outer wall and said first outer wall is positioned between said second inner wall and said second outer wall; and where said first inner wall and said second inner wall define therebetween a first chamber for said flow of exhaust, said second inner wall and said first outer wall define therebetween a second chamber for said flow of exhaust, and said first outer wall and said second outer wall define therebetween a third chamber for said flow of exhaust.

14. The decomposition chamber of claim 13, where said first double-walled element includes a bend to direct said flow of exhaust in a reversed direction from said first chamber into said second chamber.

15. The decomposition chamber of claim 13, where said second double-walled element includes a bend to direct said flow of exhaust in a reversed direction from said second chamber to said third chamber.

16. The decomposition chamber of claim 13, where at least one of said first inner wall, said second inner wall, said first outer wall, and said second outer wall is coated with a catalyst.

17. The decomposition chamber of claim 13, where at least a portion of said first inner wall has a generally conical shape.

18. The decomposition chamber of claim 13, where said first and second double-walled elements have a tubular shape.

19. The decomposition chamber of claim 13, further comprising a containment housing connected with said second outer wall of said second double-walled element.

20. The decomposition chamber of claim 13, further comprising a cap positioned in an exhaust gas inlet of said first chamber.

21. The decomposition chamber of claim 20, where said cap includes a plurality of fins for inducing said flow of exhaust to flow in a helical pattern.

22. A method, comprising:

injecting a reducing agent into a flow of exhaust;

directing said flow of exhaust into a first flow chamber defined between an outer surface of a first wall and an inner surface of a second wall that is disposed around the first wall;

reversing the direction of said flow of exhaust by directing said flow of exhaust into a second flow chamber that surrounds the first flow chamber; and reversing the direction of said flow of exhaust once again by directing said flow of exhaust into a third flow chamber that surrounds the second flow chamber, the second flow chamber having an overall area smaller than the third flow chamber.

23. The method of claim 22, where said reversing is accomplished by bends in said first and second flow chambers.

24. The method of claim 22, further comprising the step of capturing excess reducing agent in a containment housing.

25. The method of claim 22, where at least one of said first, second, and third flow chambers is coated with a catalyst.

26. The method of claim 22, further comprising inducing said flow of exhaust to flow in a helical pattern.

27. The method of claim 22, where said first flow chamber is defined by a first inner wall of a first double-walled element and a second inner wall of a second double-walled element.

28. The method of claim 27, where said second flow chamber is defined by said second inner wall of said second double-walled element and a first outer wall of said first double-walled element.

29. The method of claim 28, where said third flow chamber is defined by said first outer wall of said first double-walled element and a second outer wall of said second double-walled element.

* * * * *